United States Patent [19]
Bronsvatch

[11] Patent Number: 5,128,820
[45] Date of Patent: Jul. 7, 1992

[54] STATIC MEDIA/SPINNING HEAD STORAGE DEVICE

[75] Inventor: Efim Bronsvatch, Saratoga, Calif.

[73] Assignee: Seagate Technology, Inc., Scotts Valley, Calif.

[21] Appl. No.: 444,921

[22] Filed: Dec. 4, 1989

[51] Int. Cl.⁵ .................................................. G11B 5/48
[52] U.S. Cl. ............................................................ 360/101
[58] Field of Search ............................................ 360/101

[56] References Cited

U.S. PATENT DOCUMENTS

| | | | |
|---|---|---|---|
| 3,633,186 | 1/1972 | Lynott et al. | 360/101 |
| 3,821,812 | 6/1974 | Kato | 360/101 |
| 3,885,245 | 5/1975 | Nakatani | 360/101 |

Primary Examiner—Robert S. Tupper
Attorney, Agent, or Firm—Flehr, Hohbach, Test, Albritton & Herbert

[57] ABSTRACT

The present invention proposes a memory device comprising a fixed disc on the surface of which data may be stored, and rotating transducers or heads which may be positioned to access any location on the disc. The rotating heads are mounted on transducer arms which are designed in such a manner that the transducer seeks outward as it is rotated. Centrifugal force imparts a radial force on the arm which is movable in a low friction system along with the transducer, the radial force causing the transducer to move outward together with the radial arm with increasing rotational speed of the spindle motor.

A counteracting spring having a force in a direction opposite to the radial force would provide a radially inward force on the transducer arm, so that at any given speed the location of the transducer and the arm, and therefore the transducer's positional relationship to a desired track, is precisely determined by the balance of the inwardly acting spring force and the outwardly driving centrifugal force.

8 Claims, 2 Drawing Sheets

STATIC MEDIA/SPINNING HEAD STORAGE DEVICE

FIELD OF THE INVENTION

The present invention is directed to the field of data storage, and more particularly to a low cost data storage utilizing a single motor, a single actuator, and a single control circuit.

BACKGROUND OF THE INVENTION

All disc drives today require two precision moving parts and two motors, one for driving the actuator to position the transducer relative to the rotating disc, and a second motor to rotate the disc at a constant speed. Associated control circuitry is required for each of the motors. Substantial cost reduction is possible if a drive could be built with only one moving part or assembly. Theoretically, the cost of the mechanism and control electronics should be reduced as much as 50 percent.

All current hard disc drives have one or more rotating discs mounted on a precision spindle motor which runs at a constant speed. The data on the surface of the disc is stored in circular, concentric tracks, and is accessed using a transducer mounted on an actuator arm. The actuator arm is controlled in either linear or rotary fashion to access any location on the concentric tracks.

The actuator is controlled to maintain the transducer over the desired track location by open or closed loop servo techniques.

Typically, the transducer head is parked on power down in a landing zone, or unloaded off the disc.

The objective in the present invention is to eliminate the need for separate motors for the spindle rotation and actuator positioning, thereby reducing the parts count and the basic material costs in the disc drive.

SUMMARY OF THE INVENTION

Briefly described, the present invention proposes a memory device comprising a fixed disc on the surface of which data may be stored, and rotating transducers or heads which may be positioned to access any location on the disc. The rotating heads are mounted on transducer arms which are designed in such a manner that the transducer seeks inward as its rotational speed is decreased or increased. That is, similar to a flywheel governor in a steam engine, centrifugal force imparts a radial force on the arm which is movable in a low friction system along with the transducer, the radial force causing one end of the transducer support arm to move outward, the opposite end of the arm carrying the transducer moving radially inward over the memory surface with increasing rotational speed of the spindle motor.

A counteracting spring having a force in a direction opposite to the radial force would provide a radially balancing force on the transducer arm, in opposition to the force created by the rotational speed, so that at any given speed the location of the transducer and the arm, and therefore the transducer's positional relationship to a desired track, is precisely determined by the balance of the inwardly acting spring force and the outwardly driving centrifugal force.

DETAILED DESCRIPTION OF A PREFERRED EMBODIMENT

The operation of the present invention will first be described with reference to FIGS. 1 and 2, which are plan and sectional views of a memory device using a stationary disc and rotating transducers. Complete details of this approach can be found in the application of Sanjoy Ghose, U.S. patent application Ser. No. 07/546,513, filing date Jun. 29, 1990, 1989 entitled SINGLE MOTOR DISC DRIVE, and incorporated herein by reference.

Figure 1:
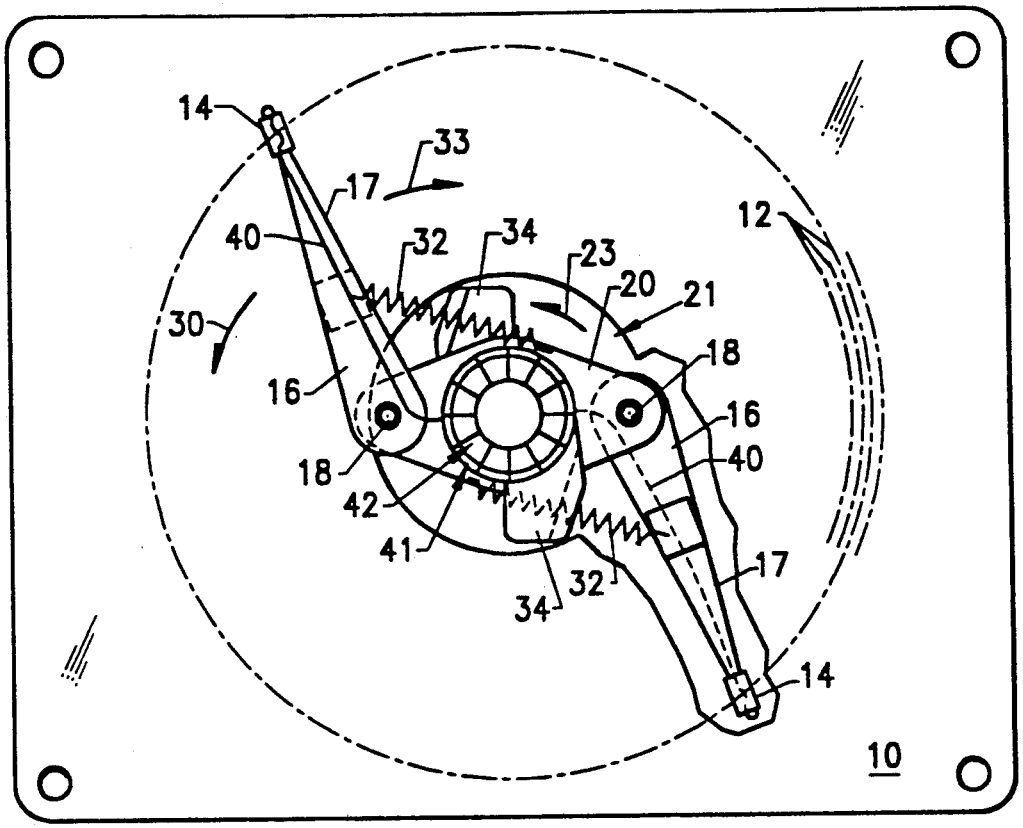
FIG. 1 is a top plan view of the essential elements of a drive designed in accordance with the present invention.

Referring first to FIG. 1, the major elements of the disc drive as they apply especially to this invention are shown including a stationary disc or other magnetic recording medium 10, having a plurality of circumferential tracks 12 written thereon. As with presently known disc drive systems, the data is stored in addressable locations along the tracks 12. However, in the disc drive which is the subject of this invention, the magnetic medium is stationary and the transducers for accessing the data are movable over the magnetic recording surface.

The transducers 14 are mounted on the ends of head arms 16. Although in this embodiment a pair of head-arm combinations 14, 16 are shown, a single arm could be used if appropriately balanced. Alternatively, the bearings and spring can be replaced by flexures which support the head arms.

Figure 2:
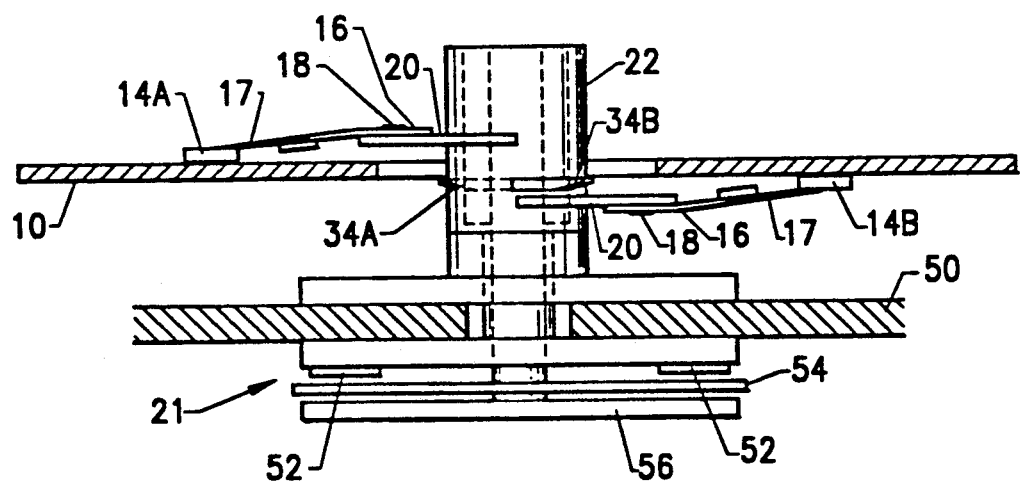
FIG. 2 illustrates the actuator arm and transducer positioning scheme of the present invention.

The heads and arms 16 are freely movable about bearings 18 mounted on a supporting plate 20 which is rotated at a controlled rate of rotation by a motor 21 which is shown in FIG. 2. The motor 21 drives a shaft 22 to which the head arm support plate 20 is fixed. The speed of the motor 21 is controlled by commands from a microprocessor incorporated in said disc drive as a function of the particular circumferential track which is to be accessed at any given time. The rotating heads and head arms are mounted on the bearings 18 in such a manner that the heads seek outward when plate 20 is rotated by motor 21 in the direction of arrow 23. That is, the system functions on principles similar to a flyball governor in a steam engine. The centrifugal force imparted by the motor 21 as it rotates the plate 20 imparts a radial force on each arm 16, causing it to move outward in the direction of arrow 30 with increasing rotational speed of the motor and plate A counteracting spring 32 attached to the plate 20 at one end and to the arm 16A, B at the other end applies a radially inward force to the arms 16 to constantly draw them back toward the plate 20 as indicated by arrows 33. At any given speed of the motor 21, the location of the head arm 16 and therefore the track over which the heads 14 are flying is precisely determined by the balance of the inwardly-acting spring force 33 and the outwardly-acting centrifugal force 30 created by the rotation of motor 21.

The retracting spring 32 also acts as a head unloading mechanism. On power down, the spring 32 pulls each of the flexures over a ramp 34 which is mounted immediately adjacent the inward edge of the magnetic recording surface, and is supported on the rotating head/arm flexure spindle mechanism. Referring again to FIG. 2, it can be seen that when the spring 32 is fully retracted, the arm 16 and head-supporting flexure 36 rest upon the ramp 34 so that the transducer does not rest on the magnetic recording surface. As the plate 20 rotates, the flexure and arm 16 move away from the ramp 34 so that the transducer 14 is flown at the correct height over the surface of the magnetic recording medium 10.

The signals from the transducer are carried on a wire 40 (FIG. 1) back to a rotary transformer 42 similar to the type used in present video cassette recorder technology and incorporated in the spindle at the center of the magnetic recording surface. The wire 40 leads to the primary side 41 which rotates with the plate 20. The signals as received at the stationary secondary side 43 can then be brought out to the external environment through leads from the secondary side 43 of the transformer 42. Note that although the transfer shown herein is radial, an axial version may alternatively be used.

The vertical sectional view of FIG. 2 also shows that the proper balance in the disc drive having arms 16 on opposite ends of the support plate 20 may be facilitated by providing a first head 14A flying over the top surface of the stationary disc 10, and a second head 14B flying over the bottom surface. An appropriate unloading ramp and wedge 34A, 34B can be provided on opposite sides of the spindle 22 to support the flexure in its unloaded position.

FIG. 2 also illustrates the necessary support structure to support the magnetic recording medium 10, arms 16, flexure 17, and transducer 14 within a disc drive, including the base casting 50, and mounted below the base casting the necessary magnets 52, coil 54 and magnetic return 56 to form a variable speed spindle motor whose speed can be adjusted to define the speed of rotation of spindle 57 and thereby the radius of travel of the rotating heads. The spindle 22 rotated by the motor so defined extends up through the base casting 50 to support the rotating arms 16.

Figure 3:
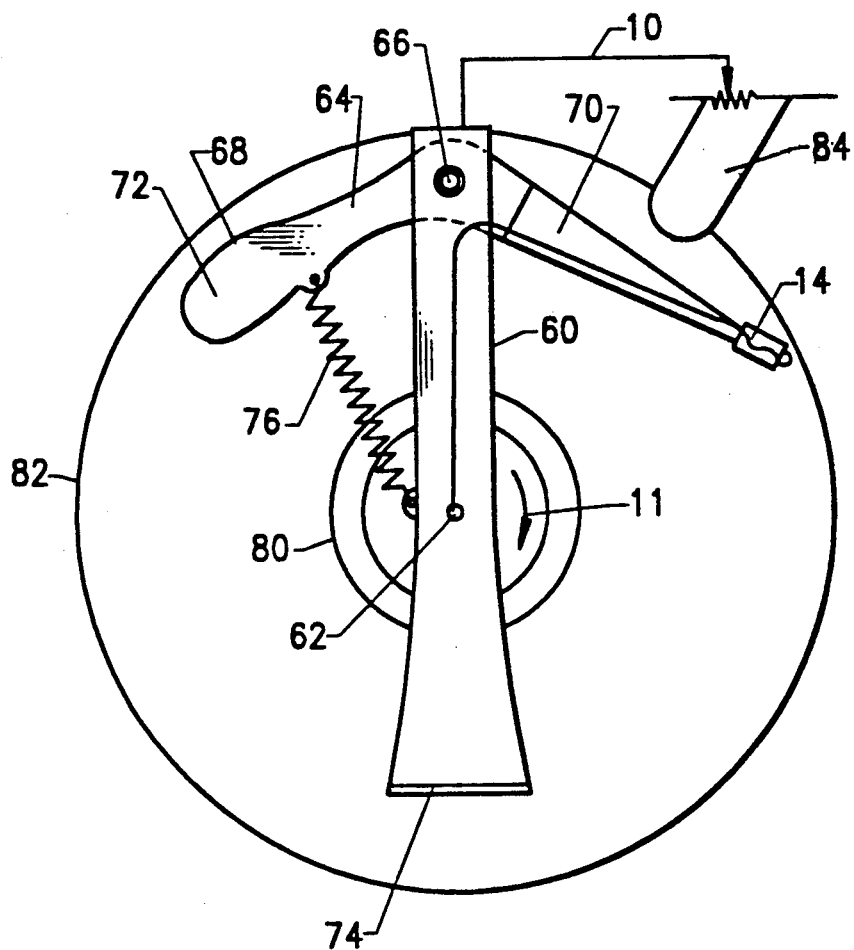
FIG. 3 is a plan view of a preferred embodiment of the present invention using a stationary disc and spinning head support arm.

FIG. 3 comprises the preferred embodiment of the present invention. The advantage of the embodiment to be discussed below wherein the transducer head begins at the outermost track from the central pivot and moves in with increasing speed is that as motor speed increases, the read/write head 14 moves toward the inner diameter; as the speed of the motor decreases, the head moves back out. This allows for constant linear velocity at the head disc interface, providing increased capacity from the increased number of sectors available at the outer diameter.

Referring to the specific structure of an exemplary embodiment, it includes an arm 60 rotating about pivot 62 at a speed which is controlled as described in the incorporated application. The technology for providing a brushless DC motor rotatable at variable speeds to achieve the objective of this invention is well known.

One end of the arm 60 mounts a transducer support arm 64 which is movable about a pivot 66. The arm 64 which is a generally V-shaped arm having first and second portions 68, 70 the arm portion 68 including a counterweight 72 to balance the weight and rotational force exerted on the head 14 supported at the distal end of the arm portion 70 from the pivot 66. At the opposite end of the arm 60 is a counterweight 74 provided to maintain the balance of the mechanism.

The arm portion 64 which incorporates the head counterweight 72 is in the embodiment of FIG. 3 attached by spring means to the main support arm 60, the spring preferably being attached to the arm at a point which is immediately adjacent the pivot point of the axis about which the arm 60 spins. The spring 76 provides a force which balances the effect of the counterweight 72 as it is urged away from the central pivot 62 by the rotational speed of the motor. The faster the motor spins, the more the counterweight 72 is urged away from the central pivot axis 62, and the further toward the inner diameter 80 of the data area the transducer 14 is moved. As the motor slows down and rotates the arm 60 at a slower rate, the spring force 76 begins to prevail over the centrifugal force 72 acting at the weight, and the weight 72 is drawn back toward the pivot axis, moving the transducer 14 toward the outer diameter 82 of the data area. When the motor is stopped, the force of the spring 76 is sufficient to cause the arm portion 70 to be carried out over the ramp 84 which is mounted from the side of the housing adjacent the data area, so that the transducer 14 is unloaded from the data area when the motor is at rest.

By providing the V-shaped arm 64 having the weight 72 coupled to the pivot through spring 76, on the opposite side of pivot 66 from arm portion 70 and transducer 14, the transducer 14 can be moved toward the inner or outer tracks of the data area which ranges from the regions indicated by line 80 to those indicated by line 82, so that the transducer may be very accurately located over any selected data recording track.

Figure 4:
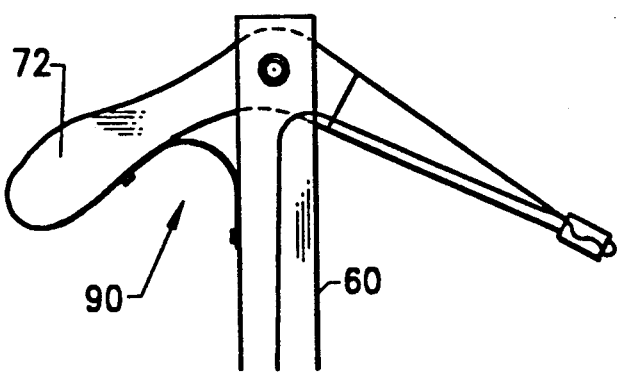
FIG. 4 illustrates an alternative embodiment of the present invention using a strip spring.

In an alternative embodiment show in FIG. 4, the spring means may be simplified by using a strip spring 90 coupling the counterweight 72 to the pivot arm 60. The use of this form of spring provides added lifetime to the design so that the spring force is not diminished with age, and the accuracy of the system is not compromised with deterioration or use of the spring component.

Alternative embodiments of the present invention may be apparent to a person of skill in the art who studies the present invention disclosure. Therefore, the scope of the invention is to limited only by the following claims.

The magnetic recording medium 10 can be round or square, in the square mode having mounting holes at the edges thereof to be inexpensively mounted to the support structure.

In summary, this disclosure details a disc drive with minimum moving parts, a single actuator and only one control circuit. Substantial cost reduction is possible with this scheme. It is recognized that the larger inertia and lower bandwidth of the servo scheme may restrict its application to slow access time drives. Nevertheless, in cost-sensitive applications, this approach provides significant benefits.

Alternatives to the present invention may become apparent to a person of skill in the art who studies the subject disclosure. Therefore, the scope of the invention is to be limited only by the following claims.

What is claimed is:

1. An apparatus for rotating a transducer above a stationary data storage surface having a plurality of concentric data tracks around an axis and for positioning said transducer above one selected data track of said data tracks while said transducer is rotating:

a spindle being able to rotate in variable velocity around said axis;
　　first supporting means attached to said spindle for rotation by said spindle, said first supporting means having at least one pivot point;

second supporting means for mounting said transducer above said data storage surface, said second supporting means are mounted on said first supporting means in such a way that, when said first supporting means are rotating with said spindle around said axis, a centrifugal force due to a rotation velocity of said first supporting means enables said second supporting means to rotate around said pivot point in a first direction, whereby the first direction rotation of said second supporting means moves said transducer means toward or outward from said axis;

means for exerting a constant force on said second supporting means, said constant force enabling said second supporting means rotate around said pivot pint in a second direction which is opposite to said first direction, whereby the second direction rotation of said second supporting means moves said transducer outward or toward from said axis;

wherein a balance between said centrifugal force due to said rotation velocity and said constant force dynamically fixes said transducer mean in a position above a specific data track; and wherein a change of said rotation velocity moves said transducer to a position above a different data track.

2. The apparatus as claimed in claim 1 wherein the data storage surface is generally disc shaped having an inner and outer diameter, the second supporting means being supported for rotation about said axis in the center of said disc-shaped region.

3. The apparatus as claimed in claim 2, wherein said second supporting means is a transducer support arm, including a pivoted lever supported at one end of said transducer support arm and having said transducer attached thereto, said lever pivoting with rotation of said transducer support arm to move said transducer generally radially over the surface of the disc-spaced storage region to selectively position the transducer over said data tracks between the inner diameter and the outer diameter, locations on each data track being accessed as the transducer rotates with the transducer support arm.

4. The apparatus as claimed in claim 3 wherein said pivoted lever comprises a generally V-shaped lever having first and second lever arm portions extending from a central section, said central portion being pivotally connected to said transducer support arm, said first arm portion supporting said transducer for track to track movement, said second lever arm portion comprising means responsive to the rotation velocity of said transducer support arm for rotating said lever about said pivot and moving said transducer from one data track to another data track.

5. The apparatus as claimed in claim 4 wherein said second lever arm portion comprises a weight substantially greater than the weight of said first lever arm portion.

6. The apparatus as claimed in claim 1, wherein said exerting means is a spring which is attached to said first supporting means and said second supporting means.

7. The apparatus as claimed in claim 6, wherein said spring is a strip spring.

8. A memory device comprising:

a spindle able to rotate with variable velocity around an axis;

a stationary data storage surface having a plurality of concentric data tracks around said axis;

first supporting means attached to said spindle for rotation by said spindle, said first supporting means having at least one pivot point;

transducer means for writing information onto and/or reading information from said data tracks;

second supporting means for mounting said transducer means above said data storage surface, said second supporting means being mounted on said first supporting means in such a way that, when said first supporting means are rotating with said spindle around said axis, a centrifugal force due to a rotation velocity of said first supporting means enables said second supporting means to rotate around said pivot point in a first direction, whereby the first direction of rotation of said second supporting means moves said transducer means toward or outward from said axis;

means for exerting a constant force on said second supporting means, said constant force enabling said second supporting means to rotate around said pivot point in a second direction which is opposite to said first direction, whereby the second direction of rotation of said second supporting means moves said transducer outward from or toward said axis;

wherein a balance between said centrifugal force due to said rotation velocity and said constant force dynamically fixes said transducer in a position above a specific data track; and wherein a change of said rotation velocity moves said transducer to a position above a different data track.

* * * * *

UNITED STATES PATENT AND TRADEMARK OFFICE
CERTIFICATE OF CORRECTION

PATENT NO. : 5,128,820

DATED : July 7, 1992

INVENTOR(S) : Efim Bronshvatch

It is certified that error appears in the above-identified patent and that said Letters Patent is hereby corrected as shown below:

On title page, items [19] and [75] change "Bransvatch" to --Bronshvatch--

Signed and Sealed this

Twenty-fourth Day of August, 1993

Attest:

BRUCE LEHMAN

*Attesting Officer*        *Commissioner of Patents and Trademarks*